United States Patent [19]
Komine

[11] Patent Number: 4,575,645
[45] Date of Patent: Mar. 11, 1986

[54] COMPACT RAMAN OSCILLATOR-AMPLIFIER OPTICAL SYSTEM

[75] Inventor: Hiroshi Komine, Torrance, Calif.

[73] Assignee: Northrop Corporation, Hawthorne, Calif.

[21] Appl. No.: 639,302

[22] Filed: Aug. 9, 1984

[51] Int. Cl.⁴ .............................................. H03F 7/00
[52] U.S. Cl. ...................................... 307/426; 372/3; 372/108; 372/101
[58] Field of Search ........................... 372/3, 108, 101; 307/425, 426

[56] References Cited
U.S. PATENT DOCUMENTS
4,280,109 7/1981 Stappaerts .............................. 372/3

OTHER PUBLICATIONS
Komine et al.; "High-Efficiency Joule-Level Raman Generation in Pb Vapor"; Opt. Lett., vol. 7; No. 4; Apr. 1982.
Stappaerts et al.; "Gain Enhancement in Raman Amplifiers with Broad Band Pumping"; Opt. Lett., vol. 5; No. 1; Jan. 1980.

Primary Examiner—Léon Scott, Jr.
Attorney, Agent, or Firm—Terry J. Anderson

[57] ABSTRACT

A Raman oscillator and amplifier utilizing a single Raman cell. The oscillator and amplifier portions of the cell are located either coaxially or adjacent to each other within a single Raman cell so as to provide a more compact arrangement. In Raman oscillator/amplifier systems employing high-temperature ovens, the invention also reduces heating requirements.

3 Claims, 1 Drawing Figure

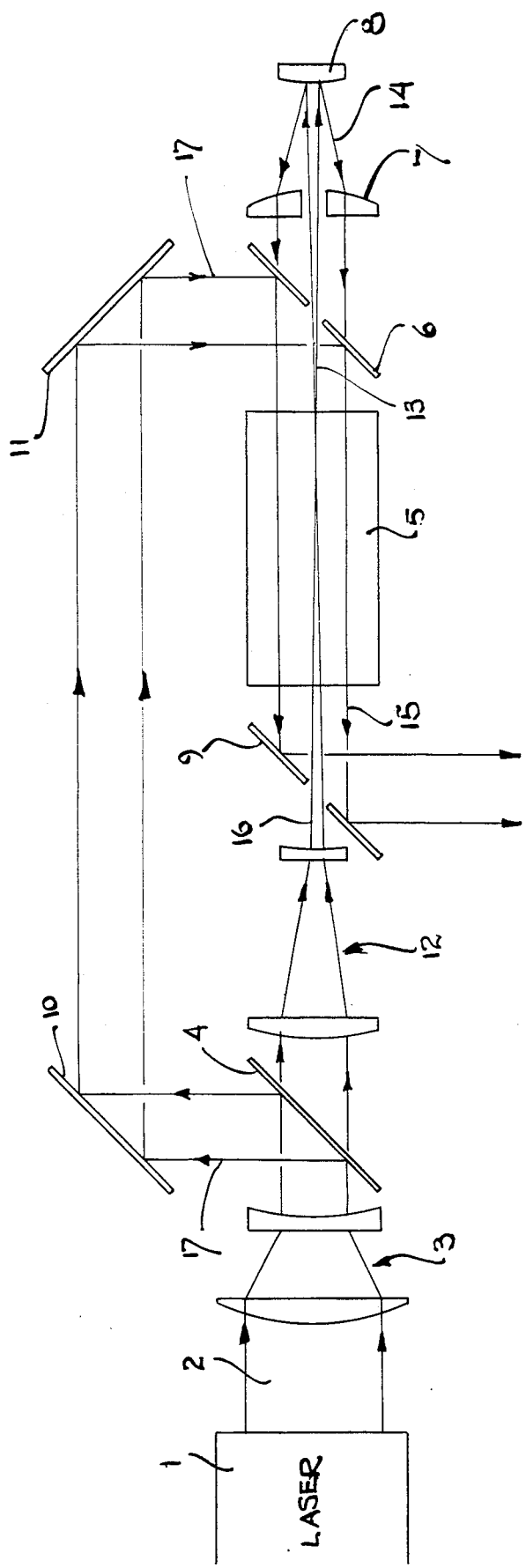

COMPACT RAMAN OSCILLATOR-AMPLIFIER OPTICAL SYSTEM

BACKGROUND OF THE INVENTION

1. Field of the Invention

This invention pertains to devices for the frequency conversion of the energy in the coherent radiation emitted from lasers. The devices utilize electronic, vibrational or rotational Raman scattering to obtain efficient frequency conversion of the energy. More particularly, this invention pertains to the optical configuration of such devices.

2. Description of the Prior Art

U.S. Pat. No. 4,280,109 ("Stappaerts") described a device for translating the frequency of the energy contained in a laser beam by utilizing higher order Strokes/Raman scattering. In Stappaerts, a first Raman cell, referred to therein as the Raman oscillator cell, is used to generate Stokes radiation, i.e., a Stokes beam, when "pumped" by a portion of the laser beam. The Stokes beam is then spatially filtered anad passed through a second Raman cell referred to therein as the Raman amplifier cell. The second cell amplifies the Stokes beam and, by the careful selection of the dimensions and operating parameters, concentrates most of the translated energy into a single order of Stokes radiation. The second Raman amplifier cell is "pumped" by a portion of the same laser beam but at a lower pumping energy density.

The disclosure of the Stappaerts patent (see colum 3, lines 58–63) also suggests that the Raman amplifier cell and the Raman oscillator cell could be combined into a single Raman cell having four ports, the path within the cell between the first and second ports functioning as the Raman oscillator cell and the path between the third and fourth ports functioning as the Raman amplifier cell. The use of a single cell, however, is not further described or depicted in the specification.

Separate oscillator and amplifier Raman cells, or a single Raman cell having four ports, may be suitable for use when a gas is used as the translation medium within the cell. However, when metal vapors are used as the translation medium, very high temperature ovens must be used to obtain the metal vapor. As a consequence, it becomes important to have a compact configuration in order to minimize the heating requirements and heat loss, which obviates the feasibility of either employing separate Raman cells or a single cell having four ports.

SUMMARY OF THE INVENTION

This invention employs a single Raman cell that is operated as both an oscillator and an amplifier. In the preferred embodiment, the oscillator portion of the Raman cell is coaxial with, and enclosed within, the path through the cell which acts as an amplifier. The coaxial arrangement of the oscillator and amplifier portions of the cell provides a more compact arrangement than conventional designs. In Raman oscillator/amplifier systems employing an oven, the invention also reduces heating requirements. Because of the common axis of the amplifier and oscillator, the alignment of the optical system used in this invention is simplified.

BRIEF DESCRIPTION OF THE DRAWING

The sole FIGURE is a schematic drawing of a preferred embodiment of the invention.

DESCRIPTION OF THE PREFERRED EMBODIMENT

Referring now to the sole FIGURE, laser 1 emits a laser beam which passes through and is reduced or condensed by reducing telescope 3. After exiting reducing telescope 3, the beam 2 is split into first and second parts 16 and 17 by beam splitter 4. The first part 16 of the beam, which passes through beam splitter 4, is condensed further by condenser 12, passes through a hole in the center of mirror 9 and then passes through a Raman cell within cell 5. The first part 16 of the beam operates as a Raman oscillator pump and is referred to herein as "the first part of the beam" or as "the oscillator pump beam".

Laser beam 2 is condensed by reducing telescope 3 and then further condensed by condenser 12 to a cross section such that the energy density of the first part 16 of the beam within Raman cell 5 is sufficient for operation of the cell as a Stokes-Raman oscillator to generate a Stokes beam 13 which includes various orders of Stokes radiation. Typically, the minimum, attainable cross section of the first part 16 of the beam in the Raman cell is diffraction limited; however, the controlling requirement is that the energy density be sufficient for generation of the Stokes beam.

The Stokes beam 13 generated within cell 5 exits the cell, passes through a hole in the center of mirror 6, passes through a hole in the center of lens 7 and then is reflected by convex mirror 8. After reflection, the reflected Stokes beam 14 passes back through the body of lens 7. Lens 7 and mirror 8 act in cooperation to expand the cross section of the reflected Stokes beam 14 and to collimate this beam.

The reflected Stokes beam 14 passes through mirror 6 and then through a region of the Raman cell 5 coaxial with and surrounding the region occupied by the oscillator pump beam 16. Mirror 6 is coated so as to be reflective at the frequency of the laser beam 2 but to be transparent at the frequency of the Stokes beam 14. The reflected Stokes beam 14 is amplified as it passes through Raman cell 5. After exiting the cell, the amplified beam 15 is reflected by mirror 7 and exits as the output of the system.

Referring again to beam splitter 4, the second part 17 of laser beam 2 is reflected by beam splitter 4 and then reflected and guided by mirrors 10, 11 and 6 so as to pass through Raman cell 5 in the same direction as the reflected Stokes beam 14. The second part 17 of the beam is sometimes referred to herein as "the amplifier pump beam". The second part 17 of the laser beam is located within Raman cell 5 so as to spatially coincide substantially with the Stokes beam 14 that has been reflected and collimated by mirror 7 and lens 8.

The amount of reduction of laser beam 2 by reducing telescope 3 is selected so as to adjust the cross-sectional area of the second part 17 of the laser beam so that the energy density of this beam 17 within cell 5 is sufficient for saturated amplification of the Stokes beam, but not so great as to produce significant radiation at higher Stokes orders than the desired output radiation 15, thereby minimizing four-wave mixing and concentrating the amplified Stokes radiation 15 within a single desired Stokes order. The selection of these parameters is described in U.S. Pat. No. 4,280,109.

Mirror 8 and lens 7 are selected so as to expand the cross section of the Stokes beam 13, that is emitted from the central portion of the Raman cell, to a cross section of approximately the same dimensions within the cell as that of the second part 17 of the laser beam reflected by lens 6 and passing through the Raman cell. In order to obtain maximum efficiency in the translation of the energy from the laser beam into Stokes radiation, the amplifier pump beam 17 and reflected Stokes beam 14 must coincide spatially (i.e., occupy the same region) within Raman cell 5.

Although the preferred embodiment includes reducing telescope 3, it should be understood that the purpose of this telescope is to adjust the energy density of the second part 17 of laser beam 2 so that its energy density, as it passes through energy density, telescope 3 could be omitted. On the other hand, if the energy density in the laser beam 2 were excessively high, reducing telescope 3 might instead be replaced by an expanding telescope. A concave mirror also could be used in place of convex mirror 8. However, the concave mirror then would have to be placed at a greater distance from lens 7 to obtain the same optical result.

For successful operation of this device, it is not necessary that the first part of the beam be located within the Raman cell in an area not also occupied by the second part of the beam. It is only necessary that there be a sufficient number of atoms within the volume occupied by the first part of the beam such that the action of both parts of the beam within the volume occupied by the first part of the beam does not completely deplete the atoms available for excitation from the ground state. However, the placement of the first part of the beam within a portion of the cell not occupied by the second part of the beam reduces the number of atoms required to be available for excitation.

Depending on the characteristics of laser 1, the emitted beam 2 may exhibit a central obscuration. If so, the first part 16 of the laser beam which is emited from condenser 12 can be oriented within the Raman cell so as to lie within the dark central region of the laser beam which has been reflected from mirror 6. For lasers whose emitted beam 2 do not exhibit this central obscuration, beam splitter 4 can be modified to have a central hole so as to totally transmit the central portion of the beam 2 and thus provide a "hole" in the laser beam 17 reflected from mirror 6 within which the laser beam 16 emitted from condenser 12 can be located.

Although, in the preferred embodiment, the first and second parts 16 and 17 of the laser beam pass through the Raman cell in opposite directions, such opposition also is not necessary to the operation of the device of the invention. The optics could be arranged 64 so that the two parts pass through the cell in the same direction. It is only necessary that the Stokes beam 13 generated by the oscillator portion of the cell be oriented and enlarged so that the enlarged Stokes beam 14 passes through the amplifier portion of the cell in the same direction as the second part 17 of the laser beam.

It also is not necessary that the first part 16 of the laser beam lie in the Raman cell within the central portion of the second part 17 of the laser beam. The first part of the beam could, instead, be located outside of, but nearby, the second part of the beam. The preferred coaxial arrangement, however, offers more compactness and some simplification in the optical alignment of the device, since the optical axes of the beams and the various lenses coincide.

As an example, the operating parameters for an actually built and tested Raman cell which utilizes lead vapor as the conversion medium are given in the following table:

TABLE 1

| Pb-VAPOR RAMAN CONVERTER PARAMETERS | | | |
| --- | --- | --- | --- |
| Parameter | Oscillator | Amplifier | Units |
| Length | 100 | 100 | cm |
| Pb Density | $10^{17}$ | $10^{17}$ | $cm^{-3}$ |
| Temperature | 1490 | 1490 | K |
| Pressure | 15 | 15 | Torr |
| Beam Area | $1.5 \times 10^{-3}$ | 4 | $cm^2$ |
| Fluence | 2.8 | 1 | $J/cm^2$ |
| Intensity | 40 | 14 | $MW/cm^2$ |
| Gain (G) | 60 | 28 | — |

I claim:

1. A device utilizing Stokes-Raman scattering for converting a beam of radiation from a laser into radiation at other wave lengths comprising:
   (a) a Raman cell,
   (b) beam splitting means for splitting the laser beam into an oscillator pump beam and an amplifier pump beam,
   (c) means for directing the amplifier pump beam so as to pass through the Raman cell,
   (d) condensing means for condensing the oscillator pump beam, and directing the condensed oscillator pump beam to pass through the Raman cell, wherein the oscillator pump beam within the Raman cell generates a Stokes beam which is emitted from the Raman cell,
   (e) enlargement means for enlarging the cross section of the Stokes beam generated by the oscillator pump beam and for redirecting the enlarged Stokes beam through the Raman cell so as to have a substantial portion of the enlarged Stokes beam spatially coincide with a substantial portion of the amplifier pump beam within the Raman cell, whereby the amplifier pump beam and the enlarged Stokes beam interact within the Raman cell so as to amplify the enlarged Stokes beam.

2. The device as claimed in claim 1 wherein the amplifier pump beam within the Raman cell has a central obscuration and the condensing means orients the oscillator pump beam so as to lie, in the Raman cell, substantially within the central obscuration.

3. The device as claimed in claim 1 wherein the condensing means and the enlargement means have a common optical axis and further comprising mirror means for directing the amplified Stokes beam out of the device.

* * * * *